United States Patent [19]

Rinderer

[11] Patent Number: 5,022,614
[45] Date of Patent: Jun. 11, 1991

[54] ONE PIECE CONDUIT CLIP

[75] Inventor: Eric R. Rinderer, Highland, Ill.

[73] Assignee: B-Line Systems, Inc., Highland, Ill.

[21] Appl. No.: 394,931

[22] Filed: Aug. 17, 1989

[51] Int. Cl.⁵ ............................................. F16L 3/00
[52] U.S. Cl. ................................... 248/62; 248/68.1;
 248/73; 248/74.1
[58] Field of Search ..................... 248/68.1, 67.5, 71,
 248/73, 70, 72, 74.1, 62

[56] References Cited

U.S. PATENT DOCUMENTS

| 421,907 | 2/1990 | Casler . | |
|---|---|---|---|
| 2,176,405 | 10/1939 | Lombard | 24/73 |
| 2,863,625 | 4/1954 | Attwood | 248/62 |
| 2,938,742 | 12/1957 | Teator | 285/162 |
| 3,226,069 | 12/1965 | Clarke | 248/68.1 X |
| 3,417,951 | 12/1968 | Rebentisch, Jr. | 248/62 |
| 3,463,428 | 8/1969 | Kindorf et al. | 248/72 |
| 3,486,726 | 12/1969 | Kindorf et al. | 248/72 |
| 3,522,921 | 7/1968 | Lytle | 248/62 |
| 3,527,432 | 6/1968 | Lytle | 248/62 |
| 3,532,311 | 10/1970 | Havener | 248/73 X |
| 3,547,385 | 12/1970 | Kindorf | 248/62 |
| 4,185,802 | 1/1980 | Myles et al. | 248/68.1 X |
| 4,429,440 | 2/1984 | Laughlin et al. | 24/486 |
| 4,790,060 | 12/1988 | Council et al. | 248/68.1 |

FOREIGN PATENT DOCUMENTS

| 178697 | 3/1962 | Sweden | 248/70 |
| 318370 | 1/1957 | Switzerland | 248/72 |

OTHER PUBLICATIONS

ERICO Products, Inc., CADDY Newsletter 1982.
Spring Steel Fasteners, Inc., New News from HIT, Circa 1982.

Primary Examiner—David L. Talbott
Attorney, Agent, or Firm—Senniger, Powers, Leavitt & Roedel

[57] ABSTRACT

A clip for securing conduit and the like to channel framing of the type comprising a pair of side flanges having outer margins formed with inwardly directed hook-shaped lips defining a slot extending lengthwise of the channel. Each lip and its corresponding flange define a recess between them extending lengthwise of the channel. The clip comprises a one-piece generally U-shaped clip member having a pair of legs with free ends. Feet at the free ends of the legs extend laterally outwardly from respective legs in opposite directions. Toes project from the feed and are spaced laterally from respective legs to define notches between the toes and respective legs. An integral protuberance projects laterally outwardly from the free end of each foot. The clip member may be inserted feet first through the slot of the channel from the outside of the channel to a position in which the toes of the feet are received in respective recesses of the channel with the lips of the channel received in the notches between the toes and the legs of the clip member. The toes are engageable with respective lips and the protuberances are engageable with respective flanges to prevent substantial swinging of the clip member in side-to-side direction with respect to the channel.

54 Claims, 3 Drawing Sheets

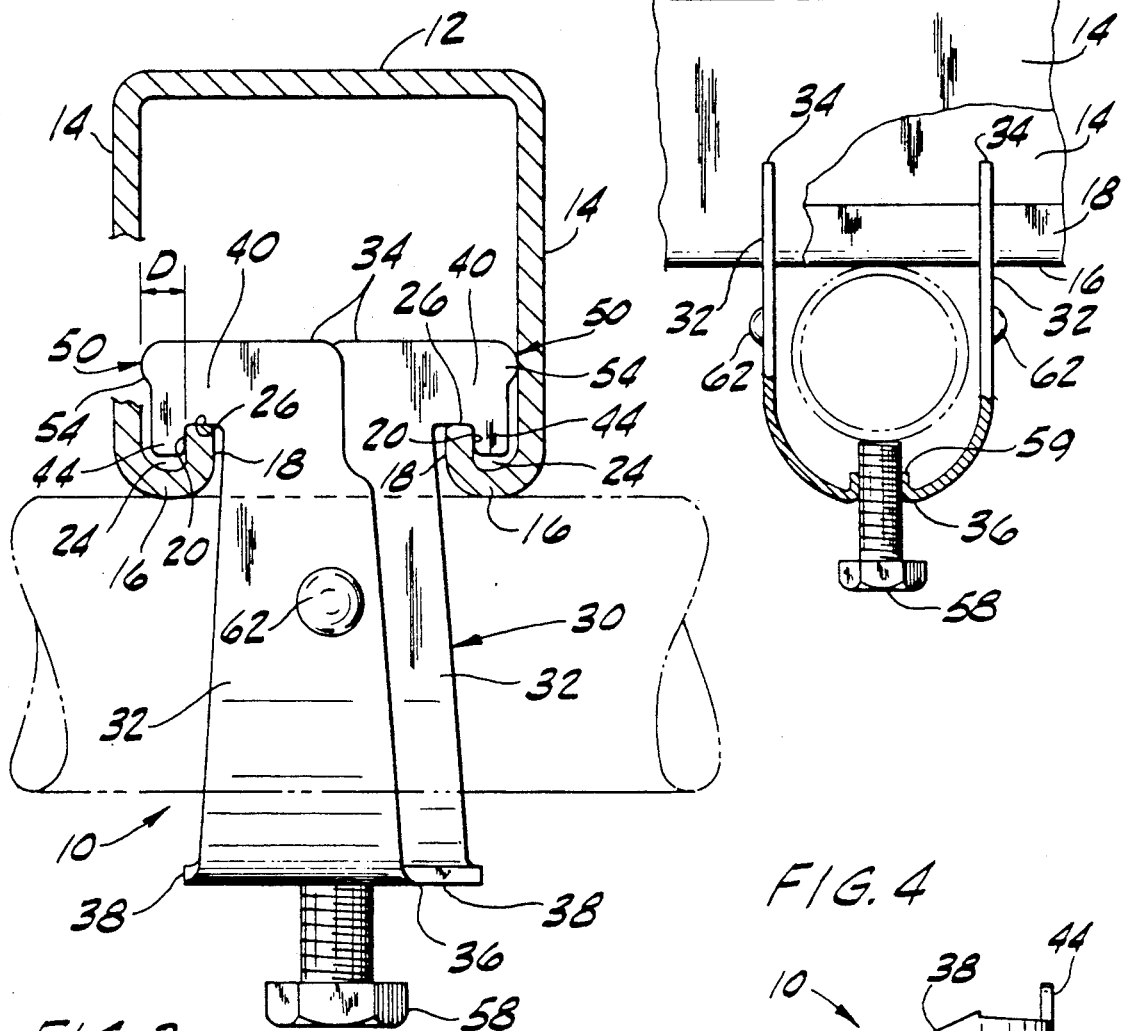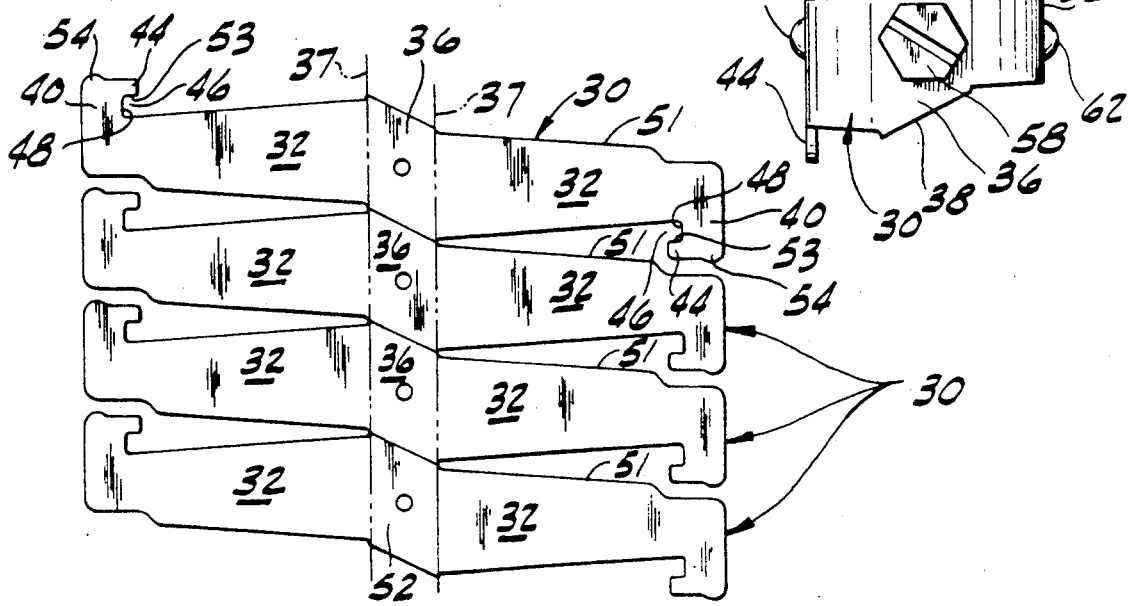

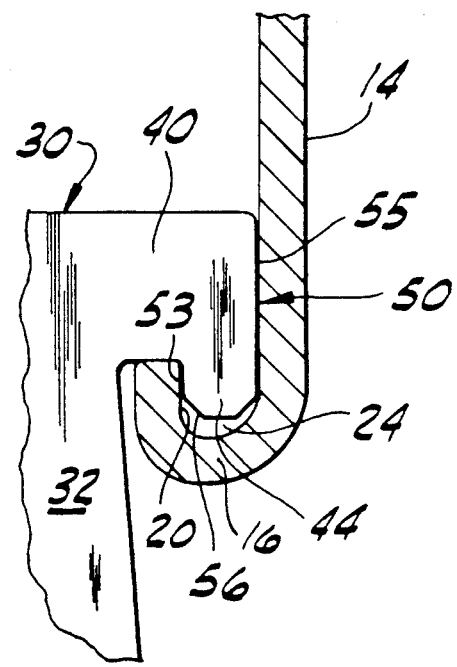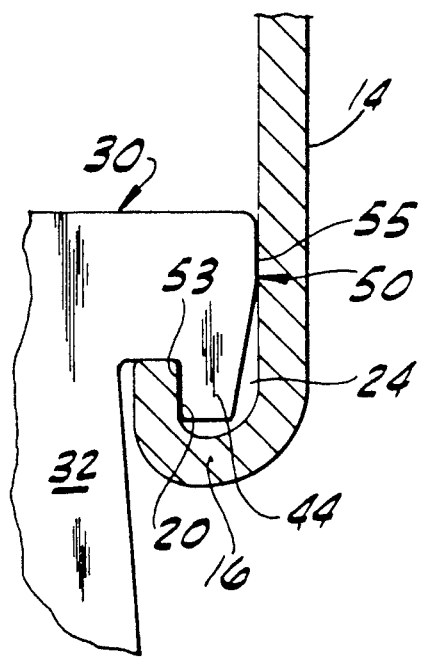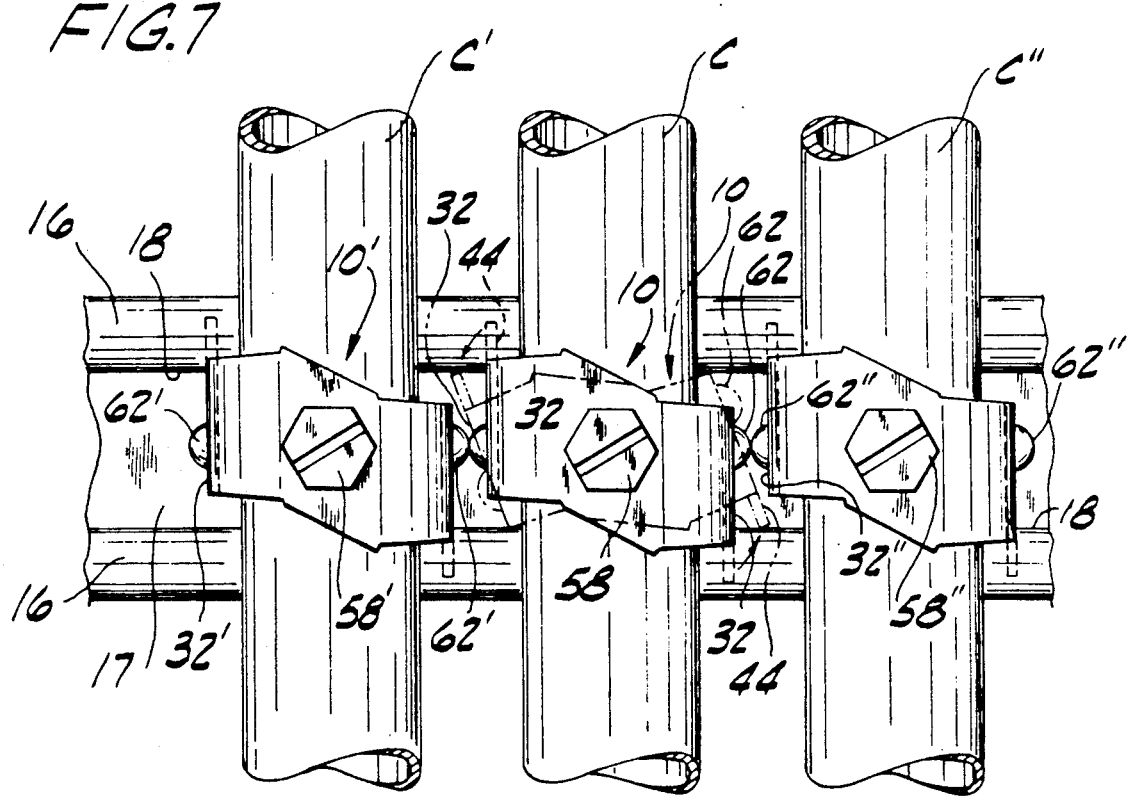

ONE PIECE CONDUIT CLIP

BACKGROUND OF THE INVENTION

This invention relates generally to devices for fastening objects to metal supports and, more particularly, to a clip for clamping electrical conduit, pipe, tubing and other such objects to channel supports.

Electrical conduit, pipes, fixtures, etc. are commonly supported overhead or on side walls either vertically or horizontally by channel supports conventionally having side flanges with inwardly turned, hook-shaped lips defining a slot therebetween. While there are many different types of supports, one type is a U-shaped clip having legs formed with feet which are engageable with the inturned lips of the channel. A screw on the clip is tightened against a conduit or pipe received between the legs of the clip to draw the feet of the clip and the object being supported into clamping engagement with the lips of the channel. A support of this type is shown, for example, in U.S. Pat. No. 4,429,440. One of the problems associated with this type of support, however, is that the clip has a tendency to swing side-to-side on the channel while the conduit or pipe is being positioned, which makes installation of the conduit or pipe more difficult, and often results in the support either becoming fully disengaged from (i.e., falling out of) the channel in the case of overhead channel, or dropping out of proper position relative to the channel in the case of channel mounted horizontally on a wall. Moreover, the cost of fabricating such clips has been relatively high.

SUMMARY OF THE INVENTION

Among the several objects of this invention may be noted the provision of an improved clip for securing a conduit, pipe or the like to a channel support; the provision of such a clip which has an anti-swing feature for maintaining the clip in proper position on the channel while conduit or pipe is being installed; the provision of such a clip which is safe and easy to use; the provision of such a clip which has means for maintaining a minimum spacing between adjacent clips mounted on the same channel so that a clip between two adjacent clips may be easily removed; the provision of such a clip with arms to inhibit unintentional movement of the clip out of the channel; the provision of such a clip which is economical to manufacture; and the provision of such a clip which has good pull-out strength.

Generally, a clip of this invention is used for securing conduit and the like to channel framing of the type comprising a pair of side flanges having outer margins formed with inwardly directed hook-shaped lips defining a slot extending lengthwise of the channel. Each lip has a first lateral surface facing the slot, a second lateral surface facing a respective flange and spaced from it to define a recess extending lengthwise of the channel, and an inner edge. The clip comprises a one-piece generally U-shaped clip member having a pair of legs with free ends. Feet at the free ends of the legs extend laterally outwardly from respective legs in opposite directions. Each foot has anti-swing means located at its free end. Toes project from the feet and are spaced laterally from respective legs to define notches between the toes and respective legs.

The clip member is adapted to be inserted feet first through the slot of the channel from the outside of the channel to a position in which the feet of the clip member are adjacent the lips of the channel with the toes of the feet received in respective recesses of the channel and with the lips of the channel received in the notches between the toes and the legs of the clip member. The toes are adapted for engagement with the second lateral surfaces of respective lips and the anti-swing means is adapted for engagement with respective flanges of the channel to prevent substantial swinging of the clip member relative to the channel in side-to-side direction with respect to the channel.

In another embodiment of the present invention, the clip member as described above is claimed in combination with the channel.

In still another embodiment of the present invention the clip comprises a clip member as described above but further including arms projecting laterally outwardly from respective legs in the same direction as the foot of the respective leg. The arms are spaced inwardly of the free end of the respective legs and are adapted for engagement with respective lips of the channel to inhibit unintentional movement of the toes out of their respective recesses.

Other objects and features will be in part apparent an in part pointed out hereinafter.

BRIEF DESCRIPTION OF THE DRAWINGS

FIG. 1 is a side elevation of a clip of the present invention as used in a channel framing member (shown in cross section);

FIG. 2 is a front elevation of the clip of FIG. 1;

FIG. 3 is a plan view of a plurality of clips in flat configuration and joined together prior to forming;

FIG. 4 is a bottom view of the clip;

FIG. 5 is a fragmentary view of a clip showing another embodiment of an anti-swing feature of this invention FIG. 6 is a fragmentary view of a clip showing yet another embodiment of the anti-swing feature;

FIG. 7 is a bottom view of three clips of this invention installed side-by-side in a single channel framing;

Corresponding parts are designated by corresponding reference numerals throughout the several views of the drawings.

DESCRIPTION OF THE PREFERRED EMBODIMENTS

Figure 8:
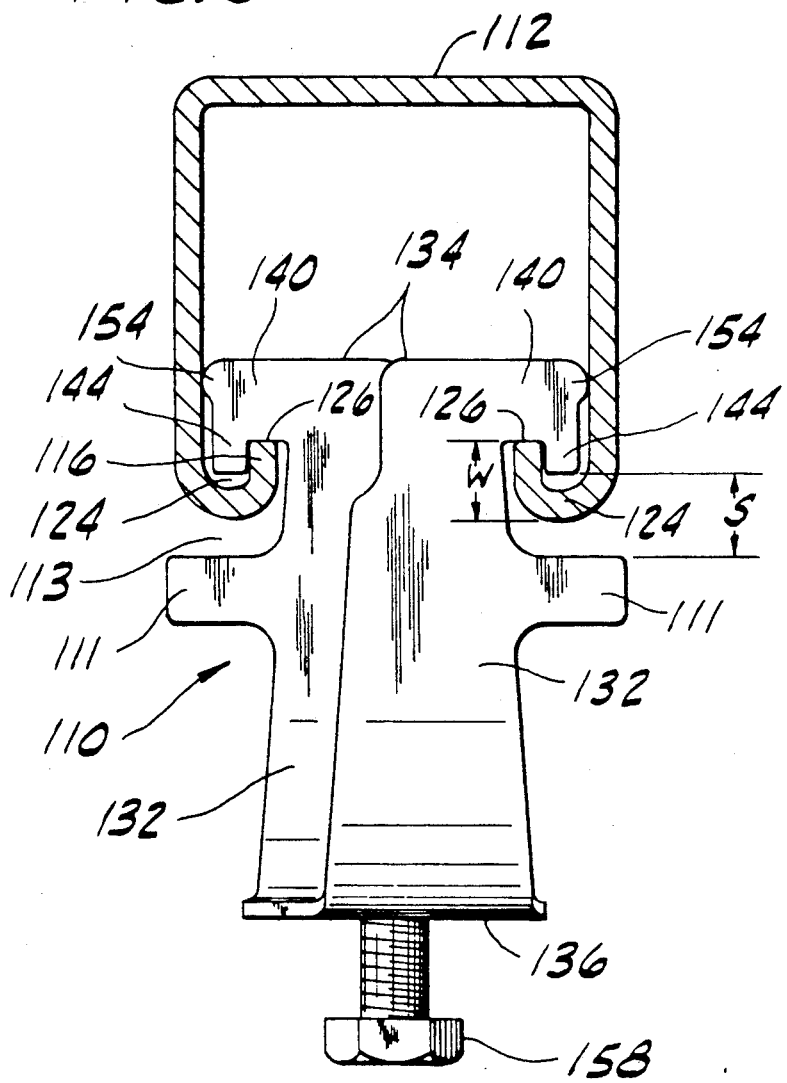
FIG. 8 is a side elevation of a second embodiment of the clip of the present invention.

Referring now to the drawings and particularly to FIG. 1, a clip of this invention, generally indicated at 10, secures conduit C and the like to channel framing 12 of the type comprising a pair of (left and right) side flanges 14 having outer margins formed with inwardly directed, hook-shaped lips 16 defining a slot 17 between them extending lengthwise of the channel. Each lip 16 has a first lateral surface 18 facing the slot 17, a second lateral surface 20 facing a respective flange 14 and spaced from the flange to define a recess 24, between the surface 20 and the flange 14, which extends lengthwise of the channel 12. The lips 16 have inner edges 26 extending lengthwise of the channel 12 which bound the second lateral surfaces 20 on their inward sides. As shown in the drawings, the slot 17 of the channel 12 opens downwardly, as when the channel is mounted on a ceiling. However, it is to be understood that the clip 10 of the present invention may be used when the channel 12 is disposed with its slot 17 opening generally laterally such as when the channel is mounted on a side wall.

The clip 10 comprises a one-piece, generally U-shaped clip member, generally indicated at 30, having a pair of generally planar legs 32 with free ends 34. A connecting portion 36 of generally uniform width extends between the legs 32 at their bottom ends and integrally connects the legs with the legs lying in substantially parallel planes. As best seen in FIG. 4, connecting portion 36 has opposite ends integrally connected to respective legs 32, and generally parallel side edges 38 of the connecting portion 36 extend at an angle with respect to the plane of each leg 32 so that the legs are laterally offset with respect to one another. Feet 40 at the free ends 34 of the legs 32 extend laterally outwardly from respective legs in opposite directions of each other. Rectangular toes 44 project generally downwardly, as shown in FIG. 1, from the feet 40 at positions laterally spaced from respective legs 32. The toes 44 and respective legs 32 define U-shaped notches 46 between them, with the feet defining straight bottom edges 48 of the notches. Each leg 32 and its respective foot 40 and toe 44 lie in substantially the same plane. Anti-swing means, indicated generally at 50, is located at the free end of each foot.

The clip 10 may be manufactured by stamping clip member blanks 51, shown in FIG. 3, from a relatively wide web of sheet metal. The web extends from a coil of sheet metal and is fed into a die in the direction indicated by an arrow 52 in FIG. 3. The clip member blanks 51 are then stamped from the web with their lengthwise extension from foot to foot being transverse to the direction of feed 52. The connecting portions 36 of the clip members have a greater width than the legs 32 at their junctures with the connecting portions. The additional width of each connecting portion forms a bridge by which the clip member blanks 51 remain attached after the stamping operation although the legs of each clip member blank are fully cut out of the sheet metal. Because the clip member blanks 51 are stamped transversely to the direction of feed, the blanks may remain connected together through the forming operation in which the legs are bent along bend lines 37 to their final positions. Heretofore, some clips have been stamped from a relatively narrow web of sheet metal with their lengthwise extension from foot to foot being parallel to the direction of feed. In order to form the blanks into finished clips, the blanks must be separated from each other prior to the forming operation. As a result, the tooling required for individual handling and forming of each clip blank is more expensive than that required to produce the clip 10 of the present invention. Further, because the clip member blanks 51 remain connected through the forming operation, the rate of production of clips of the present invention is greater than that of the stated prior clips.

As seen in FIG. 3, the angled shape of the connecting portion 36 of the clip 10 of this invention causes the legs 32 to be laterally offset prior to being bent to their final position. Therefore, when the legs 32 are bent along bend lines 37 to their final positions, the legs project generally perpendicularly from the plane including the connecting portion 36. The direction of the loading force applied to the clip 10 by the weight of the conduit C and the clamping of the conduit against the channel 12 (described infra), is also generally perpendicular to the plane including the connecting portion 36, such that the legs are loaded in tension and bending moments are minimized. The stated prior art clips are stamped with their legs laterally aligned so that when bent to their final, laterally offset position, the legs extend at an angle to the plane including the connecting portion of the clip. The direction of the loading force carried by the clip will be, as described above, perpendicular to the plane including the connecting portion of the clip. However, the direction of the loading force will be at an angle to the lengthwise extension of the legs. Therefore, the load on the legs will include a larger bending moment component and less of the load will be carried in tension by the legs. Because legs 32 the clip 10 carry a greater component of the load in tension, the clip 10 has superior pull out strength to the stated prior clip.

To attach the clip 10 to the channel 12, the clip member 30 is turned on a generally vertical axis so that the feet 40 are aligned with the slot 17 of the channel. The feet 40 are then inserted inwardly (upwardly as shown) through the slot 17 from outside (beneath) the channel 12 to a position in which the feet of the clip member 30 are adjacent the lips 16 of the channel with the toes 44 received in respective recesses 24 of the channel. The end of each toe is preferably tapered or chamfered to facilitate insertion of the toe into a respective channel recess 24. The lips 16 of the channel 12 are received in the notches 46 between the toes 44 and the legs 32 of the clip member 30 with the generally flat inner edge of each lip 26 in flush engagement with the straight bottom edge 48 of a respective notch across the entire lateral width of the inner edge (see FIG. 1). The toes 44 each have a first lateral edge 53 which engages the second lateral surface 20 of a respective lip 16 while the anti-swing means 50 engages the flange 14 to prevent substantial swinging of the clip member 30 relative to the channel 12 in side-to-side direction with respect to the channel.

In the embodiment shown in FIG. 1, the anti-swing means 50 comprises integral protuberances 54 on the feet 40 protruding laterally from the free ends of the feet and terminating in free ends. The lateral distance D between the first lateral edge 53 of each toe 44 and the free end of its respective protuberance 54 is only slightly less than the distance between the second lateral surface 20 of the lip and a respective flange 14. It will be understood that the anti-swing means 50 make take other forms, including those illustrated in the fragmentary views of FIGS. 5 and 6. As shown in those figures, the anti-swing means 50 consists of a laterally outer edge 55 of the foot 40 which is parallel to the first lateral edge 53 of the toe 44. The lateral distance between the first lateral edge 53 of the toe 44 and the laterally outer parallel edge 55 of the foot 40 is only slightly less than the distance between the second lateral surface 20 of the lip and a respective flange 14.

In FIG. 5, the laterally outer edge 55 extends parallel to the first lateral edge 53 of the toe down to near the bottom of the toe with the toe having chamfered lateral corners 56 at its bottom. In FIG. 6, the laterally outer edge 55 extends only a short distance. The toe 44 is tapered from a point spaced down from the top of the foot 40 to the bottom of the toe. The narrowing of the toe 44 near the bottom, whether by chamfer or tapering, facilitates insertion of the toe into the recess 24.

Because of the close clearance between the first lateral edge 53 of the toe 44 and the second lateral surface 20 of the lip 16, and between the free end of the protuberance 54 (or laterally outer edge 55) and the flange 14, the clip member 30 is substantially prevented from swinging in side-to-side direction relative to the channel 12. Hanging conduit with clips of the same general type as the present invention, but which lack anti-swing means is a slow and delicate process. Once inserted into the channel, the clips are often struck inadvertently such as by the conduit as it is positioned for reception between the legs of the clip. Absent the integral anti-swing means 50 of the present invention, such an impact causes a swinging motion because of the large clearance space between the free end of the foot and the flange of the channel. This swinging motion makes installation of the conduit difficult difficult and also tends to lift the toe of the opposite leg upward and out of the recess 24 formed by the opposite lip 16, causing the clip to become disengaged from the channel 12. The clip must then be repositioned in the channel. However, if a clip 10 of the present invention is struck, the engagement of the anti-swing means 50 of each leg 32 with the respective flange 14 and of the first lateral surface 52 of the toe 44 with the second lateral surface 20 of the lip 16 prevents the clip member from swinging to an extent which would allow it to become disengaged from the channel.

A screw member 58 is threadable through an aperture 59 in the connecting portion 36 of the clip member 30 for engagement with a conduit C received between the legs 32 of the clip member. As the screw member 58 is tightened against the conduit C the conduit is forced inwardly (upwardly as shown) into clamping engagement with the underside of the lips 16 of the channel 12. The engagement of the conduit C with the channel lips 16 forces the feet 40 of the clip member 30 downward into clamping engagement with the lips 16 of the channel 12, thus securing the clip member to the channel 12.

As shown in FIG. 7, several clips 10, 10', 10" may be attached to a single channel 12 for supporting a plurality of conduits C, C', C". Spacer means, constituting dimples 62, 62', 62" projecting laterally outwardly from each leg, maintains a minimum spacing between the clip 10 and adjacent clips 10', 10" on opposite sides of the clip. The dimples 62, 62', 62" project outwardly approximately 0.01 inches from their respective legs 32, 32', 32" and lie in the same plane as the axis of rotation of their respective screw members 58, 58', 58". The dimple 62 on each leg 32 engages one of the dimples 62', 62" on one of the adjacent clip legs 32', 32" so that a spacing of approximately 0.02 inches is maintained between legs of adjacent clips. The spacing is sufficient to allow the clip 10 to be rotated to the position shown in phantom in FIG. 7 where the toes 44 of each leg 32 clear the channel lips 16 so that the clip 10 may be removed from the channel 12 while the other clips 10', 10" remain engaged in the channel. Thus, the removal of a single conduit is greatly simplified with considerable savings of labor because any one of several clips attached to a single channel in side-by-side relationship may be removed without removing the other clips. The advantage is additive because a single conduit is likely to be supported by several clips on several channels so that the labor savings is repeated for each such channel. Although the size of the clips will be different according to the size of the conduit being supported, the dimples are positioned on each clip so that they will engage the dimples of a clip of any other size to maintain proper spacing.

Figure 9:
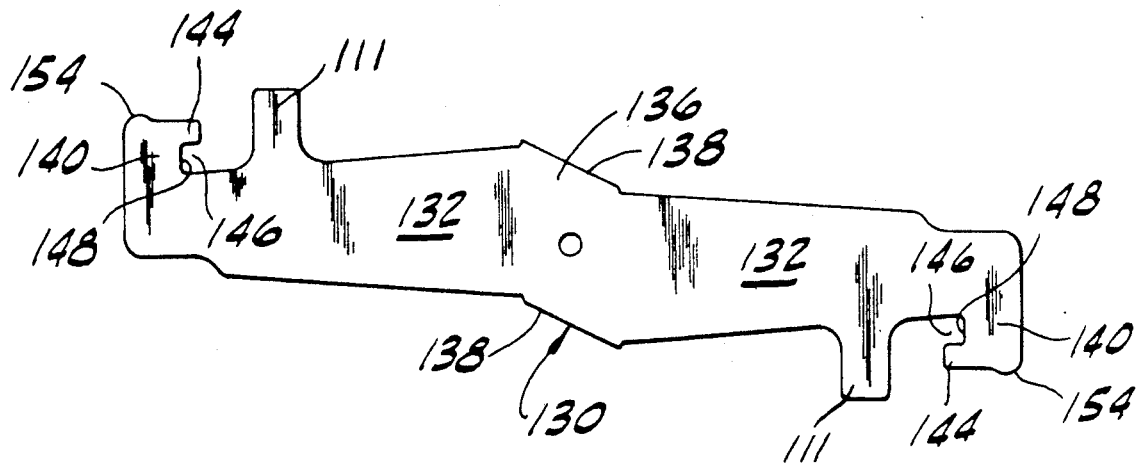
FIG. 9 is a plan view of the clip of FIG. 8 prior to forming.

Referring now to FIGS. 8 and 9 of the drawings, a second embodiment of the invention is illustrated. The reference numerals are the same as those indicating corresponding parts in the previous embodiment, but with the addition of "100". The clip 110 is the same as described above, but further includes arms 111 extending laterally outwardly from respective legs 132 in the same directions as the foot 140 of the respective leg. The arms 111 are spaced from the free ends 134 of respective legs 132. If, prior to receiving the conduit C, the clip 110 is pushed upward into the channel 112, the arms 111 will engage respective lips 116 of the channel to inhibit unintentional movement of the toes 144 out of their respective recesses 124 so that the clip will not be accidentally disengaged from the channel. The arm 111 and toe 144 of each leg are spaced apart longitudinally of the respective leg to permit passage of a respective channel lip 116 between them into a respective notch 146. The spacing S between each arm and toe is only slightly greater than the width W of each lip 116. For example, the clearance between the toe 144 and the inner edge 126 of each channel lip 116 when the clip 110 is pushed all the way into the channel 112 so that the arms 111 engage bottom of the lips may be on the order of 0.04 inches. Therefore, the channel lips 116 may not pass between the arms 111 and respective toes 144 unless the space S between them is closely aligned with the respective lip before the clip 110 is rotated. Although the clearance is relatively small, the clip 110 may be quickly and easily installed and removed by a person who pushes the clip into the channel 112 and holds the arms 111 against the underside of the channel while rotating. However, should the clip 110 be struck from below and pushed into the channel 112, it is unlikely that the clip would rotate about a vertical axis at the precise moment of alignment of the space S between the arm 111 and the toe 144 with the lip 116, and fall out of the channel. Instead, engagement of the lips 116 by the arms 111 reverses the inward motion of the clip 110 by engaging the underside of the channel 112 and forces the toes 144 back into the recesses 124 to retain the clip in the channel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A clip for securing conduit and the like to channel framing of the type comprising a pair of side flanges having outer margins formed with inwardly directed hook-shaped lips defining a slot therebetween extending lengthwise of the channel, each lip having a first lateral surface facing said slot, a second lateral surface facing a respective flange and spaced therefrom to define a recess therebetween extending lengthwise of the channel, and an inner edge, said clip comprising, a one-piece generally U-shaped clip member having a pair of legs with free ends, a single foot at the free end of each leg, the two feet on said legs extending laterally outwardly from respective legs in opposite directions, toes projecting from the feet spaced laterally from respective legs to define notches between the toes and respective legs, and anti-swing means at the free end of each foot, said clip member being adapted to be inserted feet first through said slot of the channel from the outside of the channel to a position in which the feet of the clip member are adjacent the lips of the channel with the toes of the feet received in respective recesses of the channel and with the lips of the channel received in the notches between the toes and the legs of the clip members, said toes being formed for engagement with said second lateral surfaces of respective lips and said anti-swing means being formed for engagement with respective flanges of the channel to prevent substantial swinging of the clip member relative to the channel in side-to-side direction with respect to the channel.

2. A clip as set forth in claim 1 wherein said clip member further comprises a connecting portion integrally connecting the legs, said legs being bent from the connecting portion along bend lines extending generally perpendicular to the length of the legs.

3. A clip as set forth in claim 1 wherein said clip member is formed from sheet metal with each leg and its respective foot and toe lying in substantially the same plane, each two having a first lateral edge adapted for engagement with said second lateral surface of a respective lip, said anti-swing means on each foot comprising a laterally outer edge of the foot, the lateral distance between said first lateral edge of the toe and said laterally outer edge of the foot being only slightly less than the distance between said second lateral surface of the lip and a respective flange of the channel.

4. A clip as set forth in claim 3 wherein said laterally outer edge of each foot is generally parallel to said first lateral edge of the respective toe.

5. A clip as set forth in claim 1 wherein each of the legs of the clip member is generally planar, said clip member further comprising a connecting portion of generally uniform width integrally connecting the legs, said connecting portion having side edges extending obliquely with respect to the plane of each leg whereby the legs of the clip member are laterally offset with respect to one another.

6. A clip as set forth in claim 5 wherein the width of said connecting portion is generally greater than the width of the legs at the juncture between the legs and the connecting portion.

7. A clip as set forth in claim 6 wherein the side edges of the connecting portion are generally parallel.

8. A clip as set forth in claim 7 further comprising a screw member threadable through said connecting portion for engagement with a conduit received between the legs of the clip member thereby to draw said feet of the clip member and said conduit into clamping engagement with the lips of the channel.

9. A clip as set forth in claim 7 wherein said legs lie in generally parallel planes.

10. A clip as set forth in claim 1 further comprising spacer means on each leg of the clip member for maintaining a minimum spacing between the clip and adjacent clips on opposite sides thereof thereby to permit the clip to be rotated for removal from the channel.

11. A clip as set forth in claim 10 wherein said spacer means comprises a dimple projecting laterally outwardly from each leg, said dimple and leg being of one-piece, integral construction.

12. A clip as set forth in claim 10 further comprising a screw member threadable through said connecting portion for engagement with a conduit received between the legs of the clip member thereby to draw said feet and said conduit into clamping engagement with the lips of the channel.

13. A clip as set forth in claim 12 wherein said spacer means on each leg and the axis of rotation of said screw member lie in a single plane.

14. A clip as set forth in claim 1 wherein each of said notches has a straight bottom edge formed by a respective foot for engagement with the inner edge of a respective lip, and a straight side edge formed by a respective toe and extending generally perpendicular to the bottom edge for engagement with said second lateral surface of a respective channel lip.

15. A clip as set forth in claim 14 wherein each of said toes is rectangular in shape.

16. A clip as set forth in claim 1 further comprising arms extending laterally outwardly from respective legs in the same direction as the foot of the respective leg, the arms being spaced inwardly of the free end of the respective legs and being adapted for engagement with respective lips to inhibit unintentional movement of the toes out of their respective recesses.

17. A clip as set forth in claim 16 wherein the arm and toe of each leg are spaced apart to permit passage therebetween of a respective channel lip into a respective notch, the spacing between said arm and toe being only slightly greater than the width of the lip.

18. A clip for securing conduit and the like to channel framing of the type comprising a pair of side flanges having outer margins formed with inwardly directed hook-shaped lips defining a slot therebetween extending lengthwise of the channel, each lip having a first lateral surface facing said slot, a second lateral surface facing a respective flange and spaced therefrom to define a recess therebetween extending lengthwise of the channel, and an inner edge, said clip comprising, a one-piece generally U-shaped clip member having a pair of legs with free ends, feet at the free ends of the legs extending laterally outwardly from respective legs in opposite directions, toes projecting from the feet spaced laterally from respective legs to define notches between the toes and respective legs, and anti-swing means at the free end of each foot, said clip member being adapted to be inserted feet first through said slot of the channel from the outside of the channel to a position in which the feet of the clip member are adjacent the lips of the channel with the toes of the feet received in respective recesses of the channel and with the lips of the channel received in the notches between the toes and the legs of the clip member, said toes being adapted for engagement with said second lateral surfaces of respective lips and said anti-swing means being adapted for engagement with respective flanges of the channel to prevent substantial swinging of the clip member relative to the channel in side-to-side direction with respect to the channel, said clip member being formed from sheet metal with each leg and its respective foot and toe lying in substantially the same plane, each toe having a first lateral edge adapted for engagement with said second lateral surface of a respective lip, said anti-swing means on each foot comprising an integral protuberance on the foot protruding laterally from the free end of the foot and terminating in a free end, the lateral distance between said first lateral edge of the toe and the free end of the protuberance being only slightly less than the distance between said second lateral surface of the lip and a respective flange of the channel.

19. In combination with channel framing of the type comprising a pair of side flanges having outer margins formed with inwardly directed hook-shaped lips defining a slot therebetween extending lengthwise of the channel, each lip having a first lateral surface facing said slot, a second lateral surface facing a respective flange and spaced therefrom to define a recess therebetween extending lengthwise of the channel, and an inner edge, a clip for clamping conduit and the like to the channel, said clip comprising, a one-piece generally U-shaped clip member having a pair of legs with free ends, a single foot at the free end of each leg, the two feet on said legs extending laterally outwardly from respective legs in opposite directions, and toes projecting from the feet spaced laterally from respective legs to define notches between the toes and respective legs, said clip member being adapted to be inserted feet first through said slot of the channel from the outside of the channel to a position in which the feet of the clip member are adjacent the lips of the channel with the toes of the feet received in respective recesses of the channel and with the lips of the channel received in the notches between the toes and the legs of the clip member, each toe having a first lateral edge formed for engagement with said second lateral surface of a respective lip and each foot having a laterally outer edge formed for engagement with the respective flange, the lateral distance between said first lateral edge of the toe and the laterally outer edge of the foot being only slightly less than the distance between said second lateral surface of the lip and a respective flange of the channel thereby to prevent substantial swinging of the clip member relative to the channel in side-to-side direction with respect to the channel.

20. A combination as set forth in claim 19 wherein said laterally outer edge of each foot is generally parallel to said first lateral edge of the respective toe.

21. A combination as set forth in claim 19 wherein said clip member is formed from sheet metal with each leg and its respective foot and toe lying in substantially the same plane.

22. A combination as set forth in claim 19 wherein each of the legs of the clip member is generally planar, said clip member further comprising a connecting portion of generally uniform width integrally connecting the legs, said connecting portion having side edges extending at an oblique angle with respect to the plane of each leg whereby the legs of the clip member are laterally offset with respect to one another.

23. A combination as set forth in claim 22 wherein the width of said connecting portion is generally greater than the width of the legs at the juncture between the legs and the connecting portion.

24. A combination as set forth in claim 23 wherein the side edges of the connecting portion are generally parallel.

25. A combination as set forth in claim 24 further comprising a screw member threadable through said connecting portion for engagement with a conduit received between the legs of the clip member thereby to draw said feet of the clip member and said conduit into clamping engagement with the lips of the channel.

26. A combination as set forth in claim 24 wherein said legs lie in generally parallel planes.

27. A combination as set forth in claim 19 further comprising spacer means on each leg of the clip member for maintaining a minimum spacing between the clip and adjacent clips on opposite sides thereof thereby to permit the clip to be rotated for removal from the channel.

28. A combination as set forth in claim 27 wherein said spacer means comprises a dimple projecting laterally outwardly from each leg, said dimple and leg being of one-piece integral construction.

29. A combination as set forth in claim 27 further comprising a screw member threadable through said connecting portion for engagement with a conduit received between the legs of the clip member thereby to draw said feet and said conduit into clamping engagement with the lips of the channel.

30. A combination as set forth in claim 28 wherein said spacer means on each leg and the axis of rotation of said screw member lie in a single plane corresponding to the central longitudinal plane of the channel generally perpendicular to said slot.

31. A combination as set forth in claim 19 wherein each of said notches has a straight bottom edge formed by a respective foot for engagement with the inner edge of a respective lip, and a straight side edge formed by a respective toe and extending generally perpendicular to the bottom edge for engagement with said second lateral surface of a respective channel lip.

32. A combination as set forth in claim 19 wherein each of said toes is rectangular in shape.

33. A combination as set forth in claim 19 further comprising arms extending laterally outwardly from respective legs in the same direction as the foot of the respective leg, the arms being spaced inwardly of the free end of the respective legs and being adapted for engagement with respective lips to inhibit unintentional movement of the toes out of their respective recesses.

34. A combination as set forth in claim 33 wherein the arm and toe of each leg are spaced apart to permit passage therebetween of a respective channel lip into a respective notch, the spacing between said arm and toe being only slightly greater than the width of the lip.

35. A combination as set forth in claim 19 wherein said clip member further comprises a connecting portion integrally connecting the legs, said legs being bent from the connecting portion along bend lines extending generally perpendicular to the length of the legs.

36. A clip for securing conduit and the like to channel framing of the type comprising a pair of side flanges having outer margins formed with inwardly directed hook-shaped lips defining a slot therebetween extending lengthwise of the channel, each lip having a first lateral surface facing said slot, a second lateral surface facing a respective flange and spaced therefrom to defining a recess therebetween extending lengthwise of the channel, and an inner edge, said clip comprising, a one-piece generally U-shaped clip member comprising a pair of generally planar legs with free ends, a connecting portion of generally uniform width integrally connecting the legs, said connecting portion having opposite ends integrally connected to respective legs and side edges extending at an oblique angle with respect to the plane of each leg whereby the legs of the clip member are laterally offset with respect to one another, a single foot at the free end of each leg, the two feet on said legs extending laterally outwardly from respective legs in opposite directions, toes projecting from the feet spaced laterally from respective legs to define notches between the toes and respective legs, said clip member being adapted to be inserted feet first through said slot of the channel from the outside of the channel to a position in which the feet of the clip member are adjacent the lips of the channel with the toes of the feet received in respective recesses of the channel and with the lips of the channel received in the notches between the toes and the legs of the clip member.

37. A clip as set forth in claim 36 wherein the width of said connecting portion is generally greater than the width of the legs at the juncture between the legs and the connecting portion.

38. A clip as set forth in claim 37 wherein the side edges of the connecting portion are generally parallel.

39. A clip as set forth in claim 38 further comprising a screw member threadable through said connecting portion for engagement with a conduit received between the legs of the clip member thereby to draw said feet of the clip member and said conduit into clamping engagement with the lips of the channel.

40. A clip as set forth in claim 38 wherein said legs lie in generally parallel planes.

41. A clip as set forth in claim 36 further comprising spacer means on each leg of the clip member for maintaining a minimum spacing between the clip and adjacent clips on opposite sides thereof thereby to permit the clip to be rotated for removal from the channel.

42. A clip as set forth in claim 41 wherein said spacer means comprises a dimple projecting laterally outwardly from each leg, said dimple and leg being of one-piece, integral construction.

43. A clip as set forth in claim 41 further comprising a screw member threadable through said connecting portion for engagement with a conduit received between the legs of the clip member thereby to draw said feet and said conduit into clamping engagement with the lips of the channel.

44. A clip as set forth in claim 43 wherein said spacer means on each leg and the axis of rotation of said screw member lie in a single plane.

45. A clip as set forth in claim 36 wherein each of said notches has a straight bottom edge formed by a respective foot for engagement with the inner edge of a respective lip, and a straight side edge formed by a respective toe and extending generally perpendicular to the bottom edge for engagement with said second lateral surface of a respective channel lip.

46. A clip as set forth in claim 45 wherein each of said toes is rectangular in shape.

47. A clip as set forth in claim 36 further comprising arms extending laterally outwardly from respective legs in the same direction as the foot of the respective leg, the arms being spaced inwardly of the free end of the respective legs and being adapted for engagement with respective lips to inhibit unintentional movement of the toes out of their respective recesses.

48. A clip as set forth in claim 47 wherein the arm and toe of each leg are spaced apart to permit passage therebetween of a respective channel lip into a respective notch, the spacing between said arm and toe being only slightly greater than the width of the lip.

49. A clip as set forth in claim 36 wherein said legs are bent from the connecting portion along bend lines extending generally perpendicular to the length of the legs.

50. A clip for securing conduit and the like to channel framing of the type comprising a pair of side flanges having outer margins formed with inwardly directed hook-shaped lips defining a slot therebetween extending lengthwise of the channel, each lip having a first lateral surface facing said slot, a second lateral surface facing a respective flange and spaced therefrom to define a recess therebetween extending lengthwise of the channel, and an inner edge, said clip comprising, a one-piece generally U-shaped clip member comprising a pair of generally planar legs with free ends, a connecting portion of generally uniform width integrally connecting the legs, said connecting portion having side edges extending to an oblique angle with respect to the plane of each leg whereby the legs of the clip member are laterally offset with respect to one another.

a single foot at the free end of each leg, the two feet on said legs extending laterally outwardly from respective legs in opposing directions, toes projecting from the feet spaced laterally from respective legs to define notches between the toes and respective legs, arms extending laterally outwardly from respective legs in the same direction as the foot of the respective leg, the arms being spaced inwardly of the free ends of the respective legs, said clip member being adapted to be inserted feet first through said slot of the channel from the outside of the channel to a position in which the feet of the clip member are adjacent the lips of the channel with the toes of the feet received in respective recesses of the channel and with the lips of the channel received in the notches between the toes and the legs of the clip member, the arms being adapted for engagement with respective lips to inhibit unintentional movement of the toes out of their respective recesses.

51. A clip for securing conduit and the like to channel framing of the type comprising a pair of side flanges having outer margins formed with inwardly directed hook-shaped lips defining a slot therebetween extending lengthwise of the channel, said lips terminating in inner edges on opposite sides of the slot, each clip comprising, a one-piece generally U-shaped clip member comprising a pair of generally planar legs with free ends, a connecting portion integrally connecting the legs, a single foot at the free end of each leg, the two feet on the legs extending laterally outwardly from respective legs in opposite directions, an arm extending laterally outwardly from each leg in the same direction as the foot of the leg, the arm being spaced from the foot for receiving a respective channel lip therebetween, said clip member being adapted to be inserted feet first through said slot of the channel from the outside of the channel to a position in which each channel lip is disposed between the foot and arm of a respective leg of the clip member with the foot of the clip member disposed for engagement with the inner edge of the channel lip, the arms being adapted for engagement with respective channel lips to inhibit unintentional movement of the feet inwardly a substantial distance away from the inner edges of the channel lips.

52. A clip as set forth in claim 51 further comprising a screw member threadable through said connecting portion for engagement with a conduit received between the legs of the clip member thereby to draw the feet and the conduit into clamping engagement with the lips of the channel, said screw member being rotatable on an axis, the arms being oriented so that, when the clip is disposed with said axis vertical, the arms extend horizontally from said legs.

53. A clip as set forth in claim 52 wherein the width of each arm is relatively small compared to the length of its respective leg.

54. A clip as set forth in claim 53 wherein the length of each arm is greater than the length of a respective foot.

* * * * *